Sept. 17, 1940.   A. TAUB   2,214,941
COMBUSTION CHAMBER OF INTERNAL COMBUSTION ENGINES
Filed Nov. 25, 1938   4 Sheets-Sheet 1

Alex Taub
Inventor by
Blackmore, Spencer & Flint
Attorney

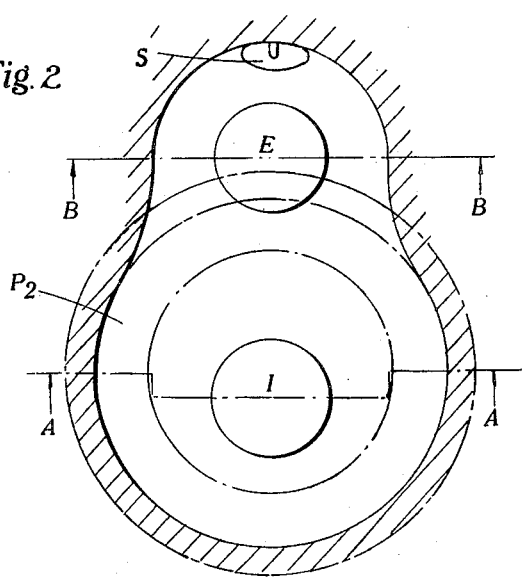
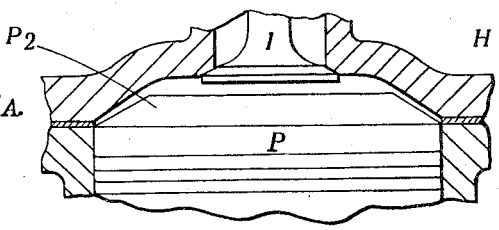
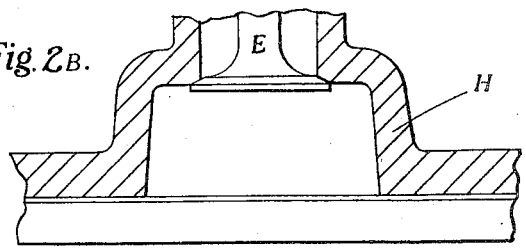
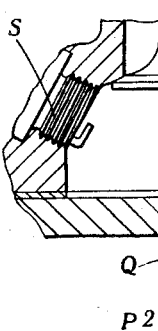

Sept. 17, 1940.   A. TAUB   2,214,941
COMBUSTION CHAMBER OF INTERNAL COMBUSTION ENGINES
Filed Nov. 25, 1938   4 Sheets-Sheet 3
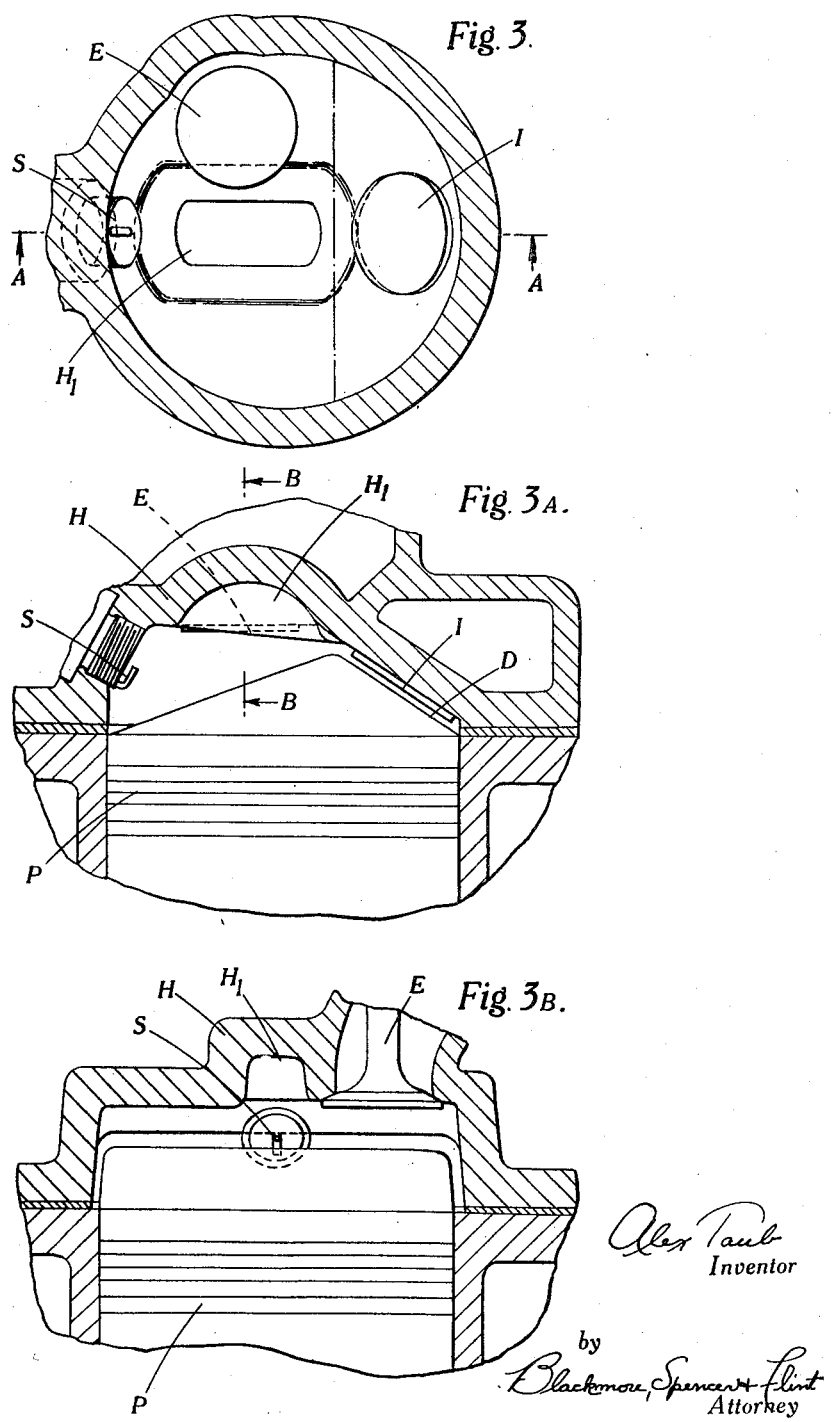

Sept. 17, 1940.  A. TAUB  2,214,941
COMBUSTION CHAMBER OF INTERNAL COMBUSTION ENGINES
Filed Nov. 25, 1938  4 Sheets-Sheet 4

Alex Taub
Inventor by
Blackmore, Spencer & Flint
Attorney

Patented Sept. 17, 1940

2,214,941

UNITED STATES PATENT OFFICE 2,214,941

COMBUSTION CHAMBER OF INTERNAL COMBUSTION ENGINES

Alex Taub, Hendon, London, England, assignor to General Motors Corporation, Detroit, Mich., a corporation of Delaware Application November 25, 1938, Serial No. 242,375
In Great Britain November 26, 1937

2 Claims. (Cl. 123—191)

This invention relates to internal combustion engines and particularly to combustion chambers thereof.

The object of the invention is to produce better control of combustion in a combustion chamber so as to minimise shock and detonation.

Shock is due to too rapid a rise of pressure due to the process of combustion, particularly when the piston is at or adjacent top dead centre. If the pressure rises too rapidly the engine is said to be rough: if the rise is kept below a certain rate, the engine is smooth. The pressure rise in the process of combustion can be co-related with ratio of burned gas volume to distance of flame front travel. By correctly proportioning the ratio of the rate of increase of burned gas volume to the rate of increase of distance travelled by the flame front, the rate of pressure increase, and hence the roughness of the engine, can be controlled.

Detonation is compression ignition due to the last portion of the charge to be burned being compressed into a small space having too large a volume-to-surface ratio: the expansion of the burned gases forces the unburned portion into a small space and unless this unburned portion can be kept cool enough, it will ignite spontaneously and cause detonation. Detonation thus is avoided by keeping the last portion of the charge to be burned cool enough, to prevent it from igniting spontaneously. This is effected by providing a small ratio of volume-to-surface in that part of the chamber remote from the spark plug, and specifically by providing an adequate clearance space area between the roof of that part of the chamber and the piston at top dead centre position. The degree of clearance necessary to avoid detonation is fairly critical: usually it lies between .030" and .090". Such a clearance space, in that region of the chamber where the last part of the charge burns, forms what may be called an anti-detonation pocket.

The requirements for avoidance of shock, and the requirements for the avoidance of detonation tend however to be antagonistic; for if in the middle portion of the chamber, away from the spark plug, where the charge burns when the piston is around the top-dead-centre position, one provides a low enough ratio of volume-to-surface, to prevent too rapid a pressure rise, it is found that it is difficult to provide the necessary low ratio of volume-to-surface to prevent detonation in the region remote from the spark plug. A compromise can be effected but this involves some loss of power.

A more specific object of this invention is to fulfil the apparently conflicting conditions requisite for the simultaneous elimination of shock and detonation, without any sacrifice of power, in overhead valve engines.

This is effected by forming the top of the combustion chamber and the top of the piston at the side away from the spark plug, of such a shape that when the piston is at top-dead-centre position an inclined clearance space or anti-detonation pocket is formed, and by shaping those surfaces, in the region adjacent the spark plug, so that of successive imaginary spherical surfaces contained within the chamber and with the ignition point at centre, that of maximum surface area is within 30% of the total distance of flame travel.

The nature of the invention, the scope of which is indicated by the appended claims, will be better understood from the following description of various embodiments of the invention which are illustrated in the accompanying drawings.

In the drawings, in which the sections taken along various section lines are designated by a suffix corresponding to the section:

Figures 2, 2A, 2B and 2C are respectively a plan and sections of a combustion chamber and piston of an overhead-valve engine, the valves being in a line at right angles to the crankshaft.

Figures 3, 3A and 3B are respectively a plan and sections of a combustion chamber and piston similar to that shown in Figures 1 and 1A but slightly modified.

The various embodiments have parts in common and these are designated by the same reference characters in the various drawings, as follows: H, the cylinderhead; I, the inlet valve; E, the exhaust valve; S, the spark plug; P, the piston; Q, the cylinder.

In the description following it is assumed that the engine cylinders are disposed in an upright or substantially vertical position.

Figure 1:
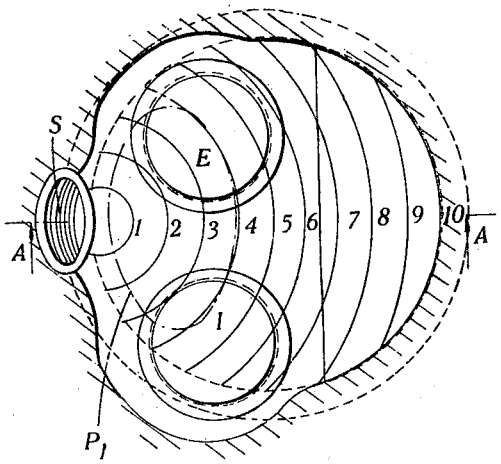
Figures 1 and 1A are respectively a plan and longitudinal section of a combustion chamber and piston of an overhead-valve engine, the valves being in a line parallel to the crankshaft axis.
Figure 1A:
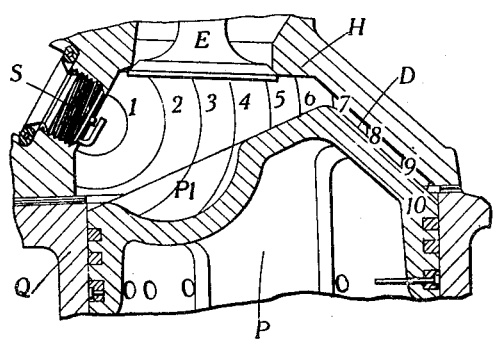

In Figures 1 and 1A the spark plug S is shown as located in an inclined wall on one side of the combustion chamber, on the line between and at right angles to the line joining the centres of the valves I and E. The valves themselves are displaced to one side of the cylinder centre line, towards the spark plug S. The top wall of the chamber on the side away from the spark plug is inclined at an angle of about 45° to a plane normal to the cylinder axis, is flat, and is of segmental shape, with the chord of the segment parallel to the valve centre line. The top of the piston P is similarly shaped as shown, so that when the piston is at top-dead-centre as shown in Figure 1A, there is provided a clearance space D which forms an anti-detonation pocket. As is understood, the clearance, for the necessary cooling should be between .030" and .090" thick. From the chord boundary the top wall of the chamber is flat and the valves I, E are located in this part. It is slightly inclined upward until it meets the downward inclined side wall as shown on the left of Figure 1A, in which the spark plug S is located. Below the spark plug the wall is substantially vertical and extends to the top of the cylinder Q.

The top of the piston P is shaped to co-operate with the top walls of the combustion chamber so as to provide a combustion space which will not produce shock. Taking the spark plug points as the centre of a sphere, then successive spherical segments, indicated 1 to 10 contained within the combustion space at increasing radii should be such that for different compression ratios, the ratio of burned gas volume increase (segmental volume) to flame travel increase (spherical radius) should not exceed the following maximum values which furthermore should be reached before the indicated flame travel expressed as a percentage of the total flame travel.

| Compression ratio | Maximum increase ratio | Flame travel |
|---|---|---|
|  |  | Percent |
| 5.5 | 2.25 | 30 |
| 6 | 2.00 | 20 |
| 6.5 | 1.80 | 15 |

In other words, if one adopts, for example, compression ratio of 5.5:1, then the shape of the chamber should be such that the ratio of the increase of burned gas volume (expressed as a percentage of the total volume) to the increase of flame travel (expressed as a percentage of the total flame travel) should at no point exceed 2.25:1; and that this maximum should in any case be reached not later than the instant when 30% of the total flame travel has been achieved. For other compression ratios then different maxima and different flame travel percentages apply.

The segmental volumes are measured best by taking cuts, at successive radii from the ignition point centre, from a plaster cast of the chamber shape by means of a spherical cutter. It is found by practice that one can assume the piston at top-dead-centre throughout the whole of the burning period.

Since flame front area also represents a measure of pressure rise, it likewise may be used for estimating the roughness or shock of combustion. Assuming the distance from the ignition point to the furthest point of the combustion chamber walls, as the full length of travel segment No. 10, then the maximum flame front area should be attained for a compression ratio of 5.5:1 within 30% of that distance. The exact position of maximum flame front area will vary for different compression ratios. The higher the ratio the shorter the distance should be from the point of ignition to the maximum flame front area.

The shape of the piston top to achieve this result will of course vary with different given conditions.

As shown in Figures 1 and 1A, in order to provide within early part of the flame travel, a larger volume-to-surface ratio than is obtained by a flat piston surface and chamber wall the wedge-shaped chamber adjacent the spark plug and converging towards the clearance space D is increased in volume between 10% and 30% of the total distance of the flame travel. This increase in volume which has the effect of increasing the ratio of burned gas volume increase to flame travel increase, over that range of flame travel, is effected by forming a hollow P1 of a roughly spherical or, more accurately hemi-ellipsoid shape in the flat piston top facing the spark plug, the approximate centre of curvature being very roughly at the spark plug ignition point. The major axis of the hollow P1 is parallel to the valve centre line and lies just outside the plane of flat piston surface.

In this way the flame front area and therefore the ration of burned gas volume increase to flame travel increase, reaches a maximum within a third of the total flame travel, which is before the piston reaches its top-dead-centre position. When the piston is at and adjacent this position, it is most susceptible to shock since the crank and connecting rod are in or almost in alignment. It is during this middle part of the flame travel that the rate of pressure rise should not be too great. This is effected by providing a lower ratio of volume-to-surface during the middle third part of the flame travel, than in the first third. In this first third the maximum rate should be located, for the crank and connecting rod are not closely in alignment. As indicated in the foregoing table this maximum should be reached earlier in the flame travel, the higher the compression ratio, and the maximum value should be less the greater the power output in terms of brake mean effective pressure, to obtain equal smoothness.

The final, third part of the flame travel takes place in the anti-detonation space D, where the ratio of surface-to-volume is large and the heat dissipation is high. In this way the spontaneous ignition or detonation is avoided.

In Figures 2, 2A, 2B and 2C the valves E and I are in a line which is at right angles to the crank shaft axis. In this arrangement the top of the piston P is formed of a frusto-conical shape, thus providing a conical annular surface P2 which in conjunction with the wall of the cylinder head away from the spark plug forms the anti-detonation pocket D as shown in Figure 2C. In the construction shown the conical surface P2 of the top of the piston is carried the whole way round the piston, but this need not be effected if it is desired to increase the volume-to-surface ratio in the middle part of the chamber. Thus the edge of the piston top nearest the spark plug S and the exhaust valve E could be made of a gently sloping shape, whilst the part away from the spark plug would be inclined as shown to form the anti-detonation pocket D. Use is made of the cooling effects of the inlet valve and thus the area of the sloping walls of the piston top and the cylinder head which form the pocket D are not so extensive.

In Figures 3, 3A and 3B are shown views of a modification of the cylinder head shown in Figures 1 and 1A, the main differences being the positions of the valves E and I, and the location of the hollowed out part of the chamber by which it is arranged that the maximum flame front area is attained in the early part of the flame travel. In the construction shown in Figures 1 and 1A the piston P was hollowed out at P1. In the construction shown in Figures 3, 3A, and 3B the upper part of the cylinder head is hollowed out at H1, instead, the adjacent part of the piston P being flat and inclined. The hollowed-out part H1 is semi-cylindrical with its axis parallel to the chord boundary line of the space D.

The valves are both over-head and use is made of the cooling effect of the inlet valve to prevent detonation in the last part of the charge to be burnt. As shown clearly in Figures 3 and 3A the inlet valve I is actually located in the inclined anti-detonation pocket D.

It will be seen from the various above described embodiments of the invention, that it can be carried into effect in various ways, use being made of the inclined clearance space away from the spark plug S to prevent detonation, the volume of the combustion space being arranged so that there is no shock during the period when the piston is in or about the top-dead-centre position. It is also clear that the inlet valve can be utilised in various ways to supplement the cooling effect of the clearance space and that if necessary the walls which form the clearance space can themselves be provided with special cooling means. It is to be understood that the above described embodiments are given as examples only and that the invention can be similarly applied to engines having various dispositions of valves and spark plugs.

If the compression ratio is increased much beyond 6.5:1, there is greater liability to detonation due to inadequate dissipation of heat. This liability to detonation is avoided according to a further feature of this invention by providing one or both of the above described inclined surfaces which form the anti-detonation space, with ribs and arranging for the contact therewith of a cooling medium.

Figure 4:
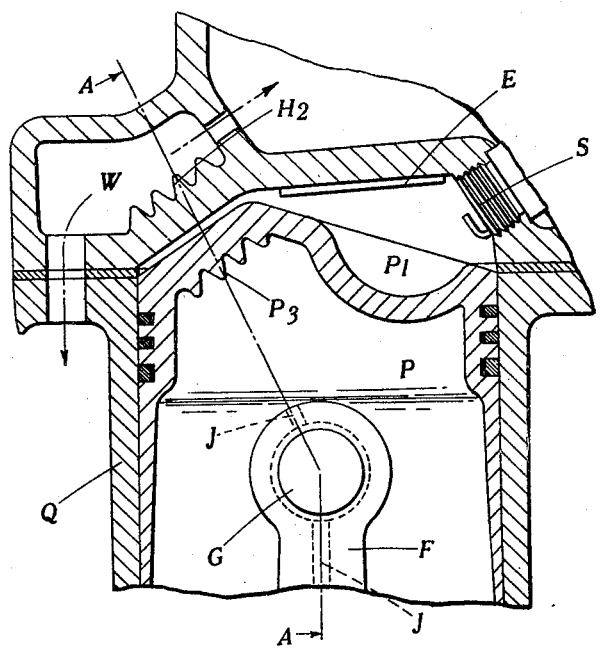
Figures 4 and 4A are sections of a modification of Figure 1A.
Figure 4A:
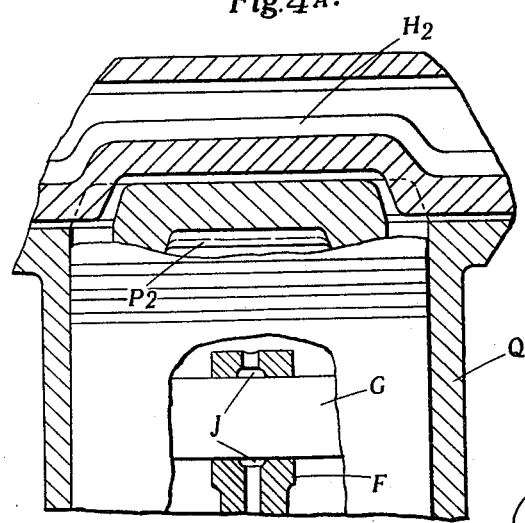

This is shown applied to a chamber as shown in Figures 1 and 1A, in Figures 4 and 4A where the inclined part of the piston top there has formed on the underside thereof a series of ribs or fins P3, and the cooling medium takes the form of oil, supplied thereto from the top end of the connecting rod F. The connecting rod is provided with an oil duct J throughout its length, and this is in communication at the bottom end with the crank shaft journal (not shown), and at the top end it is directed towards the ribs P3 on the underside of the piston top. Thus in operation, a supply of oil is sprayed or splashed against the ribs as the connecting rod rocks on the gudgeon pin G, and adequate cooling of the piston top is obtained.

When applying this feature of the invention to the inclined part of the combustion chamber wall, ribs or fins H2 are formed thereon in the water cooling space W, and the water in its circulation shown by the arrows is directed along the space W against the ribs, and thence out through ports as shown.

The surfaces of a piston top according to this invention can be machined, since they are preferably flat; and thus it is possible to use cast iron pistons and finish them accurately. The pistons can alternatively be made accurately as die castings, for example of aluminium.

I claim:

1. In an internal combustion engine of reciprocating piston type, a combustion chamber having valves in its roof, an ignition device at one side of the chamber and an antidetonation pocket of large ratio of surface to volume at that side of the chamber opposite the ignition device, the piston and chamber roof having substantially parallel surfaces inclined upward and inward from one side of the cylinder end toward the cylinder axis to form said pocket; the surfaces of the chamber wall in the region adjacent the ignition device enclosing a space in which of successive imaginary spherical surfaces contained within the chamber and with the ignition point as a center, that of maximum surface area is within 30% of the total distance of flame travel.

2. A combination as defined in claim 1, in which the top surface of the piston is provided with a cavity having a surface the center of curvature of which is approximately the ignition point of the ignition device when the piston is at top dead center.

ALEX TAUB.